(12) United States Patent
Mancuso et al.

(10) Patent No.: US 7,373,014 B1
(45) Date of Patent: May 13, 2008

(54) POST-PROCESSING METHOD FOR REDUCING ARTIFACTS IN BLOCK-CODED DIGITAL IMAGES, AND POST-PROCESSING DEVICE FOR ACTUATING SUCH METHOD

(75) Inventors: Massimo Mancuso, Monza (IT); Rinaldo Poluzzi, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/087,671

(22) Filed: May 29, 1998

Related U.S. Application Data

(63) Continuation-in-part of application No. 08/584,529, filed on Jan. 11, 1996, now Pat. No. 5,870,495.

(30) Foreign Application Priority Data

May 30, 1997 (EP) ................................. 97830264

(51) Int. Cl.
*G06K 9/40* (2006.01)
(52) U.S. Cl. ....................... 382/268; 382/266
(58) Field of Classification Search ................ 382/266, 382/268; 708/203
See application file for complete search history.

(56) References Cited

U.S. PATENT DOCUMENTS

| | | | | |
|---|---|---|---|---|
| 5,229,864 A | | 7/1993 | Moronaga et al. ........... 358/433 |
| 5,442,462 A | | 8/1995 | Guissin ....................... 358/463 |
| 5,608,652 A | * | 3/1997 | Astle ........................... 708/203 |
| 5,748,788 A | * | 5/1998 | Moro ........................... 282/243 |
| 5,819,035 A | * | 10/1998 | Devaney ................. 395/200.32 |
| 5,870,495 A | * | 2/1999 | Mancuso et al. ............ 382/199 |
| 5,883,983 A | * | 3/1999 | Lee et al. .................... 382/268 |
| 5,937,101 A | * | 8/1999 | Jeon et al. ................... 382/268 |
| 6,317,522 B1 | * | 11/2001 | Rackett ....................... 382/268 |
| 2005/0100235 A1 | * | 5/2005 | Kong et al. .................. 382/261 |
| 2005/0100241 A1 | * | 5/2005 | Kong et al. .................. 382/268 |
| 2006/0110062 A1 | * | 5/2006 | Chiang et al. .............. 382/260 |

FOREIGN PATENT DOCUMENTS

JP 0 5316316 11/1993

OTHER PUBLICATIONS

Xiaobing Lee et al., "Information Loss Recovery for Block-Based Image Coding Techniques—A Fuzzy Logic Approach," *IEEE Transactions on Image Processing*, Mar. 1995, pp. 259-273.

(Continued)

*Primary Examiner*—Cheukfan Lee
(74) *Attorney, Agent, or Firm*—Lisa K. Jorgenson; Robert Iannucci; Seed IP Law Group PLLC

(57) ABSTRACT

A post-processing method reduces artifacts in block-coded digital images. The method includes: dividing an input image into a plurality of image blocks; for each image block, estimating global features of said image block providing information on an average content of image edges along the horizontal and vertical directions of said image block; for each pixel of an image block under examination, estimating local features for said pixel providing information on the content of image edges along the horizontal and vertical directions of an image area near said pixel; modifying the value of said pixel according to both said global features of the image block to which said pixel belongs and said local features of the image area near said pixel.

24 Claims, 5 Drawing Sheets

OTHER PUBLICATIONS

Hiroyuki Okada et al., "An Adaptive Image Quality Improvement Method for DCT Coding Schemes," Telecommunications R&D Laboratories, SHARP Corporation, Chiba, Japan, Mar. 17, 1993, pp. 1-2.

Christian Derviaux et al., "Blocking Artifact Reduction of DCT Coded Image Sequences Using a Visually Adaptive Postprocessing," IEEE, 1996, pp. 5-8.

M. Mancuso et al., "Fuzzy Logic Based Image Processing in IQTV Environment," IEEE, Jun. 12, 1995, pp. 917-925.

* cited by examiner

US 7,373,014 B1

POST-PROCESSING METHOD FOR REDUCING ARTIFACTS IN BLOCK-CODED DIGITAL IMAGES, AND POST-PROCESSING DEVICE FOR ACTUATING SUCH METHOD

CROSS REFERENCE TO RELATED APPLICATION

This is a continuation-in-part of U.S. patent application Ser. No. 08/584,529, filed Jan. 11, 1996, which issued as U.S. Pat. No. 5,870,495 on Feb. 9, 1999.

TECHNICAL FIELD

The present invention relates digital image coding. More precisely, the invention relates to a post-processing method for reducing artifacts in block-coded digital images, and to a post-processing device suitable for actuating such a method.

BACKGROUND OF THE INVENTION

With the diffusion of digital communication systems, digital images are more and more used. This has led to the diffusion of still and video cameras with digital acquisition and processing capability.

In order to better exploit storage devices and transmission bandwidth, digital image compression standards have been developed, such as JPEG for still images, and MPEG-1 and MPEG-2 for digital television image sequences.

The above-referred compression standards provide for block-coding based on Discrete Cosine Transform (DCT). A digital image is divided into blocks of pixels, and each block is encoded independently from the others. DCT coefficients for the pixels of each block are evaluated and a quantization matrix is applied to the DCT coefficients to reduce the information to be stored or transmitted. When the image is to be displayed, it must be decoded in advance.

Due to the quantization process, these image compression methods are lossy, i.e., they cause a loss of information in the decoded image with respect to the original image. The decoded image can thus present noticeable degradation, mainly consisting of two kinds of artifacts known in the art under the names of "grid noise" and "staircase noise".

In order to reduce the image degradation, post-processing methods of processing the decoded image have been proposed which allow for attenuating grid noise and staircase noise.

SUMMARY OF THE INVENTION

In view of the state of the art described, it is an object of the present invention to provide a new post-processing method for reducing artifacts in block-coded digital images.

An embodiment of the invention is directed to a post-processing method for reducing artifacts in block-coded digital images. The method includes:

a) dividing an input image into a plurality of image blocks;

b) for each image block, estimating global features of said image block providing information on an average content of image edges along the horizontal and vertical directions of said image block;

c) for each pixel of an image block under examination, estimating local features for said pixel providing information on the content of image edges along the horizontal and vertical directions of an image area around said pixel;

d) modifying the value of said pixel according to both said global features of the image block to which said pixel belongs and said local features of the image area around said pixel.

Another embodiment of the invention is directed to a post-processing device for reducing artifacts in block-coded digital images. The device includes:

first means supplied with an input image for estimating global features of an image block under examination, said global features providing information on an average content of image edges along the horizontal and vertical directions of said image block;

second means supplied with said input image for estimating local features for each pixel of the image block under examination, said local features providing information on the content of image edges along the horizontal and vertical directions of an image area around said pixel;

third means supplied with said global features and said local features for modifying the value of said pixel according to both said global features and said local features.

Features and advantages of the present invention will be made apparent from the following detailed description of an embodiment thereof, illustrated as a non-limiting example in the annexed drawings.

DETAILED DESCRIPTION OF THE INVENTION

Figure 1:
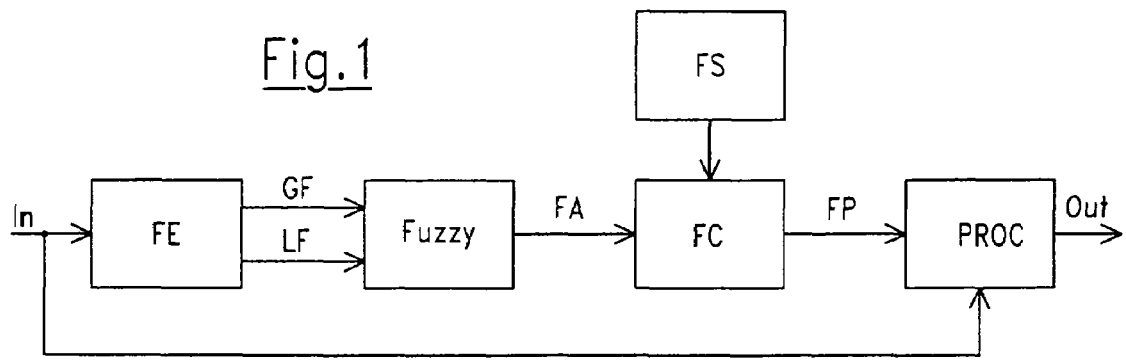
FIG. 1 is a schematic block diagram illustrating a device that implements a method according to the present invention.

With reference to FIG. 1, there is shown a block diagram illustrating a device that implements a post-processing method according to the present invention. An input decoded compressed digital image In is supplied to a Feature Extraction block FE. Block FE provides for analyzing the image to evaluate global and local features thereof. The global and local features, respectively GF and LF, of the image In evaluated by block FE are supplied as inputs to a Fuzzy Process block FUZZY which, according to fuzzy rules, determines parameters FA suitable for determining the kind of filtering to be performed, in accordance to the global and local features GF and FL of the image. The parameters FA calculated by block FUZZY are supplied to a Filter Composition block FC which according to said parameters FA determines the type of filtering to performed out of a set of predefined filters (block FS). Filter parameters FP determined by block FC are then supplied to a Processing block PROC, also supplied directly with the input image In, which performs the filtering of the input image In according to the filter parameters FP to provide a post-processed output image Out.

It appears that the kind of filtering to be performed on the decoded input image In is chosen after an estimation of the global and local features of the decoded input image. For image areas near grid noise and near an edge, a low-pass filtering is performed, to reduce both staircase noise and grid noise. For areas containing fine details (image edges and texture), no filtering is performed. Thus, the method according to the present invention provides for performing a non-linear adaptive filtering on the pixels of the decoded image.

The method outlined above will be now described in detail.

Figure 2:
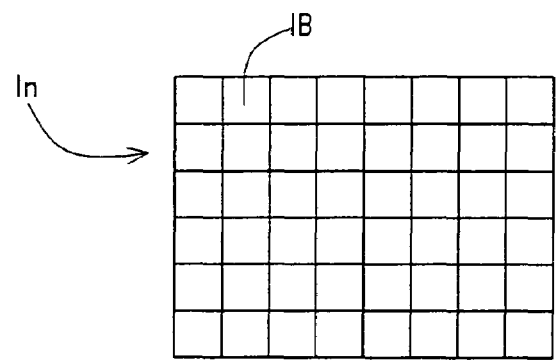
FIG. 2 shows a digital image divided into image blocks.
Figure 3:
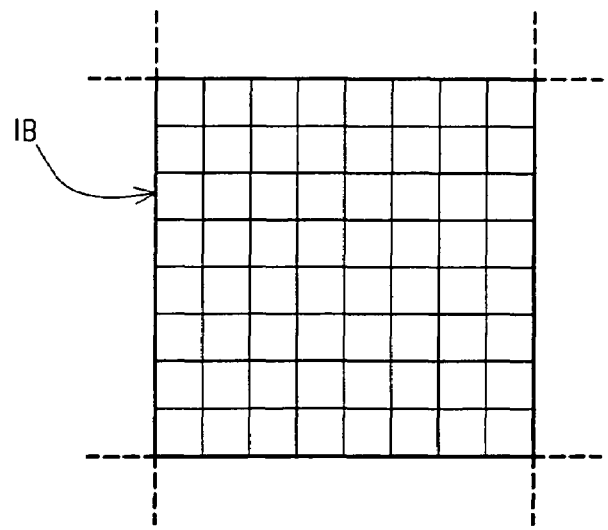
FIG. 3 shows in detail an image block of the digital image of FIG. 2.

As shown in FIG. 2, the input image In is partitioned into image blocks IB, each containing an equal number of pixels. A typical dimension of the blocks is 8*8 pixels (FIG. 3), but this is not intended as a limitation, since other block dimensions are suitable.

The image blocks IB of the input image In are scanned line by line starting from the top-left block to the bottom-right one. For each image block IB, the Feature Extraction block FE in FIG. 1 determines the global and local features GF and LF.

Figure 4:
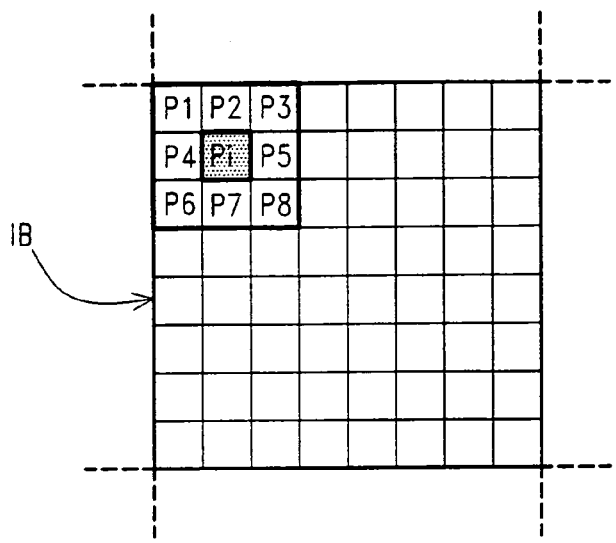
FIG. 4 shows an array of pixels of the image block of FIG. 3.
Figure 5:
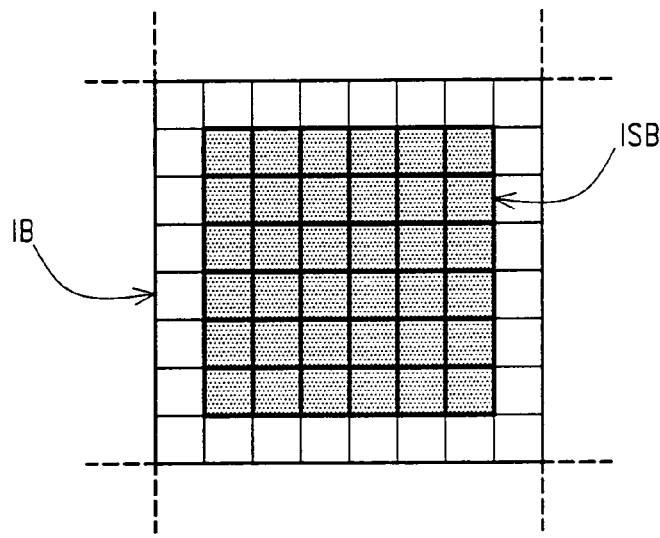
FIG. 5 shows an image sub-block of the image block of FIG. 3 used for evaluating global features of the image block.

Global features of the image block IB under examination are determined by applying horizontal and vertical Sobel operators:

$$\text{horizontal Sobel operator } (Hsob): \begin{bmatrix} h11 & h12 & h13 \\ h21 & h22 & h33 \\ h31 & h32 & h33 \end{bmatrix};$$

$$\text{vertical Sobel operator } (Vsob): \begin{bmatrix} v11 & v12 & v13 \\ v21 & v22 & v23 \\ v31 & v32 & v33 \end{bmatrix}$$

to each pixel belonging to an image sub-block internal to the image block IB. For example, the following Sobel operators:

$$Hsob: \begin{bmatrix} -1 & 0 & 1 \\ -2 & 0 & 2 \\ -1 & 0 & 1 \end{bmatrix};$$

$$Vsob: \begin{bmatrix} -1 & -2 & -1 \\ 0 & 0 & 0 \\ 1 & 2 & 1 \end{bmatrix}$$

are applied to a 6*6 pixel image sub-block ISB (gray area in FIG. 5). As shown in FIG. 4, for each pixel Pi of the image sub-block ISB a 3*3 array of neighboring pixels M centered in pixel Pi is considered, and the values of the pixels of said array M are multiplied by the coefficients of the horizontal and vertical Sobel operators, to obtain:

$$Hsob = (P3 + P8 + 2*P5) - (P1 + P6 + 2*P4),$$

$$Vsob = (P6 + P8 + 2*P7) - (P1 + P3 + 2*P2),$$

where P1-P4 and P5-P8 are the values of the pixels (gray levels).

As known, horizontal and vertical Sobel operators perform a filtering capable of detecting edges along the horizontal and vertical direction, respectively.

The output values of the horizontal Sobel operators calculated for the pixels of image sub-block ISB are accumulated to obtain an accumulated value Acc(Hsob), and the output values of the vertical Sobel operators calculated for the pixels of image sub-block ISB are accumulated to obtain an accumulated value Acc(Vsob). Acc(Hsob) gives the high-frequency content in the horizontal direction (vertical edges) of the image block IB. Acc(Vsob) gives the high-frequency content in the vertical direction (horizontal edges) of image block IB. Thus, Acc(Hsob) and Acc(Vsob) respectively provide the degree of "edgeness" of the image block under examination in the vertical and horizontal directions. It is to be noted that in order to evaluate the global features GF of the image block IB under examination, only the pixels belonging to this block are considered (by applying 3*3 Sobel operators to the 6*6 image sub-block ISB, it is not necessary to take into consideration pixels belonging to neighboring image blocks).

Global features GF of the image block under examination can be formed by the accumulated values Acc(Hsob) and Acc(Vsob). Alternatively, the global features GF of the image block can be formed by an average of the accumulated values Acc(Hsob) and Acc(Vsob), to obtain the average number of edges in the horizontal and vertical directions in the image block under examination.

Figure 6:
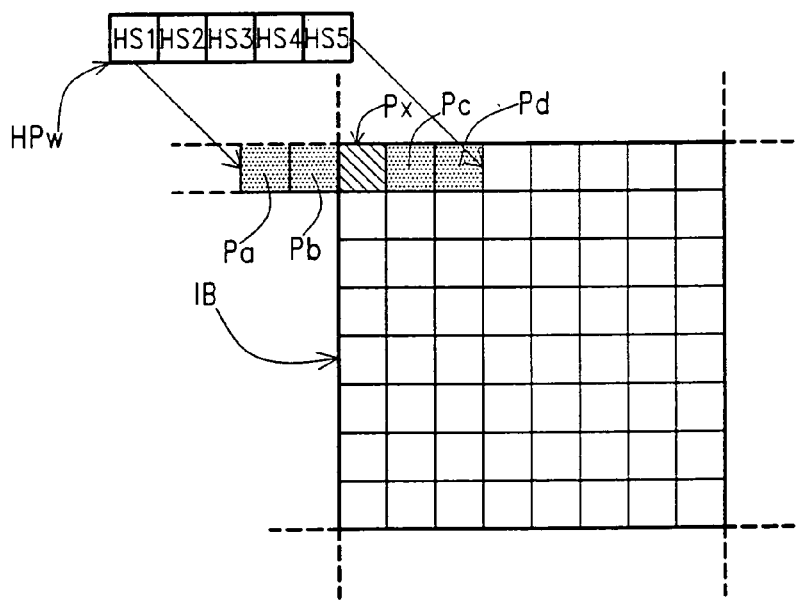
FIG. 6 shows an horizontal processing window used for evaluating local features in the horizontal direction for a generic pixel of the image block.

Local features LF of the image block IB are estimated according to the following method. All the pixels of the image block IB under examination are scanned line by line starting from the top-left pixel down to the bottom-right one. To each pixel a horizontal processing window is applied: a prescribed number of pixels respectively preceding and following the pixel under consideration and belonging to the same image line of the pixel under consideration is considered. A suitable horizontal processing window HPW is shown in FIG. 6, which is a horizontal 1*5 processing window: for a given pixel, the two preceding pixels Pa, Pb and the two following pixels Pc, Pd belonging to the same line are considered. In FIG. 6 there is shown by way of example the horizontal processing window HPW associated to the first pixel Px of the image block. It should be noted that not only the pixels of the image block IB under examination are considered, but also pixels belonging to neighboring image blocks; this is for example the case of the first, second, seventh and eight pixel of each line of pixels of the image block IB under examination.

The horizontal Sobel operator Hsob previously mentioned is applied to each pixel Pa, Pb, Px, Pc, Pd in the horizontal processing window HPW, to obtain five output values HS1-HS5. Values HS1-HS5 provide the local features in the horizontal direction for the pixel under examination Px, i.e., the high-frequency content in the horizontal direction of the image region around the pixel under examination.

Figure 7:
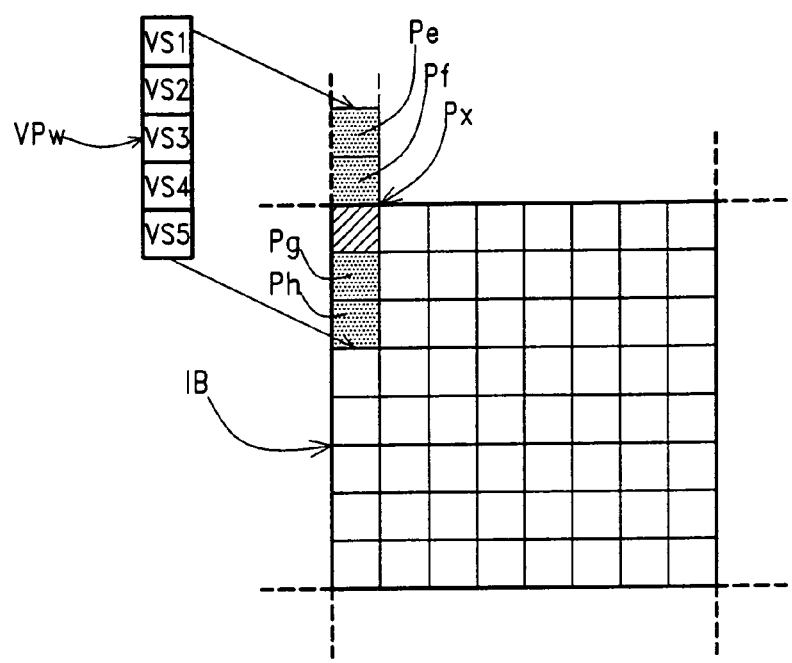
FIG. 7 shows a vertical processing window used for evaluating local features in the vertical direction for said generic pixel.

Similarly, a vertical processing window is applied to each pixel of the image block IB. The vertical processing window is formed by the pixel under consideration Px, and a prescribed number of pixels belonging to the same column as and preceding and following the pixel under consideration; for example, as shown in FIG. 7 the vertical processing window VPW can have dimensions identical to the horizontal processing window HPW (5*1), and thus contains two pixels Pe, Pf preceding pixel Px and two pixels Pg, Ph following pixel Px in the vertical direction.

The vertical Sobel operator Vsob previously mentioned is then applied to each pixel of the vertical processing window VPW to obtain five output values VS1-VS5. Values VS1-VS5 form the local features in the vertical direction for the pixel under examination, i.e., the high-frequency content in the vertical direction of an image region around the pixel under examination.

Figure 8:
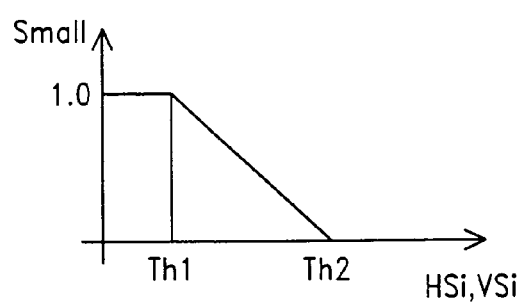
FIGS. 8 and 9 shows two membership functions used to perform a fuzzy computation.
Figure 9:
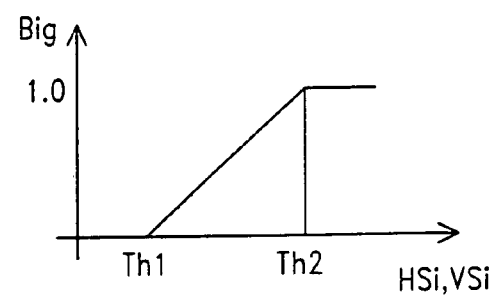

The global features GF for the image block IB under examination (i.e., the two accumulated values Acc(Hsob) and Acc(Vsob) or, in alternative, the average value of Acc(Hsob) and Acc(Vsob)) and the local features LF for the pixel under examination inside said image block (the ten values HS1-HS5 and VS1-VS5) are then supplied to the Fuzzy Process block FUZZY. The FUZZY block provides for evaluating the degrees of membership of a generic value HSi and Vsi (i=1 . . . 5) to two fuzzy sets "Small" and "Big." These degrees of membership can be evaluated by applying to HSi, VSi the membership functions depicted in FIGS. 8 and 9. In these figures, Th1 and Th2 are values depending on the global features GF of the image block under examination, i.e., on the accumulated values Acc(Hsob) and Acc(Vsob) or on the average of the accumulated values. In the first case, Th1 and Th2 are different for the Hsi and Vsi values; in the second case, Th1 and Th2 are the same for Hsi and Vsi values.

Fuzzy rules having as antecedents the degrees of membership of the output values HSi and VSi to the two fuzzy sets "Small" and "Big" are then evaluated. This means that 32 rules are to be evaluated for both the horizontal and vertical directions. However, all those fuzzy rules having the same consequence are synthesized in one rule only by an else operator. In this way, the system complexity is reduced, and a total of nine rules for each direction have to be evaluated.

The following fuzzy rules are applied to the five values HS1-HS5 associated to the horizontal direction:

1. If HS1 is Small and HS2 is Small and HS3 is Small and HS4 is Small and HS5 is Small, then $\alpha 1$ is Big;
2. If HS1 is Small and HS2 is Small and HS3 is Small and HS4 is Small and HS5 is Big, then $\alpha 2$ is Big;
3. If HS1 is Small and HS2 is Small and HS3 is Small and HS4 is Big and HS5 is Small, then $\alpha 3$ is Big;
4. If HS1 is Small and HS2 is Small and HS3 is Small and HS4 is Big and HS5 is Big, then $\alpha 4$ is Big;
5. If HS1 is Small and HS2 is Big and HS3 is Small and HS4 is Small and HS5 is Small, then $\alpha 5$ is Big;
6. If HS1 is Big and HS2 is Small and HS3 is Small and HS4 is Small and HS5 is Small, then $\alpha 6$ is Big;
7. If HS1 is Big and HS2 is Small and HS3 is Small and HS4 is Small and HS5 is Big, then $\alpha 7$ is Big;
8. If HS1 is Big and HS2 is Big and HS3 is Small and HS4 is Small and HS5 is Small, then $\alpha 8$ is Big.

The activation level of each rule depends on the degrees of membership of the pattern of output values HSi of the horizontal Sobel operator applied to the five pixels of the horizontal processing window HPW. The degrees of membership depend in turn on the global features GF of the image block to which the pixel under examination belongs. The activation level of the else (ninth) rule is computed as $\alpha else=(1-\alpha ave)$, where $\alpha ave$ is the average activation degree of fuzzy rules 1 to 8. $\alpha 1$ to $\alpha 8$ and $\alpha else$, and a similar set of nine activation degrees for the fuzzy rules applied to values VS1-VS5) form the output FA of the fuzzy process block FUZZY in FIG. 1.

Each one of the above-listed rules is associated to a respective set of predefined filter parameters, which are stored as a look-up table in block FS of FIG. 1. Suitable predefined filter parameter sets are for example:

Rule 1: (c11=1.0, c12=1.0, c13=1.0, c14=1.0, c15=1.0) if the pixel under examination lies outside the image sub-block ISB, and (c11=0.0, c12=1.0, c13=1.0, c14=1.0, c15=0.0) if the pixel under examination lies inside the image sub-block ISB;

Rule 2: (c21=0.5, c22=1.0, c23=1.0, c24=1.0, c25=0.0);
Rule 3: (c31=0.5, c32=1.0, c33=1.0, c34=0.0, c35=0.0);
Rule 4: (c41=0.5, c42=1.0, c43=1.0, c44=0.0, c45=0.0);
Rule 5: (c51=0.0, c52=0.0, c53=1.0, c54=1.0, c55=0.5);
Rule 6: (c61=0.0, c62=1.0, c63=1.0, c64=1.0, c65=0.5);
Rule 7: (c71=0.0, c72=1.0, c73=1.0, c74=1.0, c75=0.0);
Rule 8: (c81=0.0, c82=0.0, c83=1.0, c84=1.0, c85=0.5);
Else rule: (c91=0.0, c92=0.0, c93=1.0, c94=0.0, c95=0.0).

The parameters FP of the filter to be applied to the five pixels of the horizontal processing window HPW are calculated as a weighted average of the nine filters described above, with weight factors formed by the activation degrees $\alpha 1$ to $\alpha 8$ and $\alpha else$ of the respective fuzzy rules.

Assuming that $\alpha i$ is the activation degree of the i-th fuzzy rule (i=1 . . . 9), the ninth fuzzy rule being the else fuzzy rule ($\alpha 9 = \alpha else$), and cij are the coefficients of the i-th filter (i=1 . . . 9, j=1 . . . 5), the weight factor applied to the i-th filter, associated to the i-th fuzzy rule is:

$$Fi = \alpha i \cdot cij$$

and the coefficients Hj of the final horizontal filter to be applied to the pixels of the horizontal processing window HPW are given by:

$$Hj = \frac{\sum_{i=1}^{9} \alpha i \cdot cij}{N}$$

where N is a normalization factor.

The horizontally-filtered value P̲x̲ of the pixel Px under examination (at the center of the horizontal processing window) is then calculated as a weighted average of the values of the pixels Pa, Pb, Px, Pc and Pd belonging to the horizontal processing window HPW, with weight factors formed by the coefficients Hj:

$$\underline{Px} = H1*Pa + H2*Pb + H3*Px + H4*Pc + H5*Pd.$$

Similar calculations are performed for the vertical direction, starting from the output values VS1-VS5 of the vertical Sobel operators applied to the pixels Pe, Pf, Px, Pg and Ph in the vertical processing window VPW. The coefficients Vj (=1 . . . 5) of the filter for the vertical direction are calculated in a way completely similar to that used for determining the coefficients Hj:

$$V_j = \frac{\sum_{i=1}^{9} \beta_i \cdot c_{ij}}{N}$$

where $\beta_i$ (i=1 ... 9) are the activation degrees of nine fuzzy rules for the vertical direction (similar to those listed above for the horizontal direction) and $c_{ij}$ (j=1 ... 5) now are the predefined filter parameters associated to the i-th fuzzy rule for the vertical direction. The coefficients Vj are then applied to the pixels in the vertical processing window VPW to calculate a weighted average of the same. The filtered value of the pixel Px under examination, filtered in both the horizontal and vertical direction, is provided at the output Out of the processing block PROC.

The value of the pixel Px under examination to be multiplied by the vertical filter coefficient V3 can be the value P̱x obtained after having applied to the pixels in the horizontal processing window HPW the horizontal filter Hj (j=1 ... 5):

Out=$V1*Pe+V2*Pf+V3*P\underline{x}+V4*Pg+V5*Ph$.

Alternatively, it is possible to evaluate first the vertically-filtered value P̱x of the pixel under examination:

P̱x=$V1*Pe+V2*Pf+V3*Px+V4*Pg+V5*Ph$, and then performing the filtering in the horizontal direction applying to this value the respective coefficient H3 of the horizontal filter Hj:

Out=$H1*Pa+H2*Pb+H3*P\underline{x}+H4*Pc+H5*Pd$.

The sequence is of no importance, the important thing to be underlined being that at the end of the process the value of the pixel under examination is the result of both an horizontal and a vertical filtering.

Figure 10:
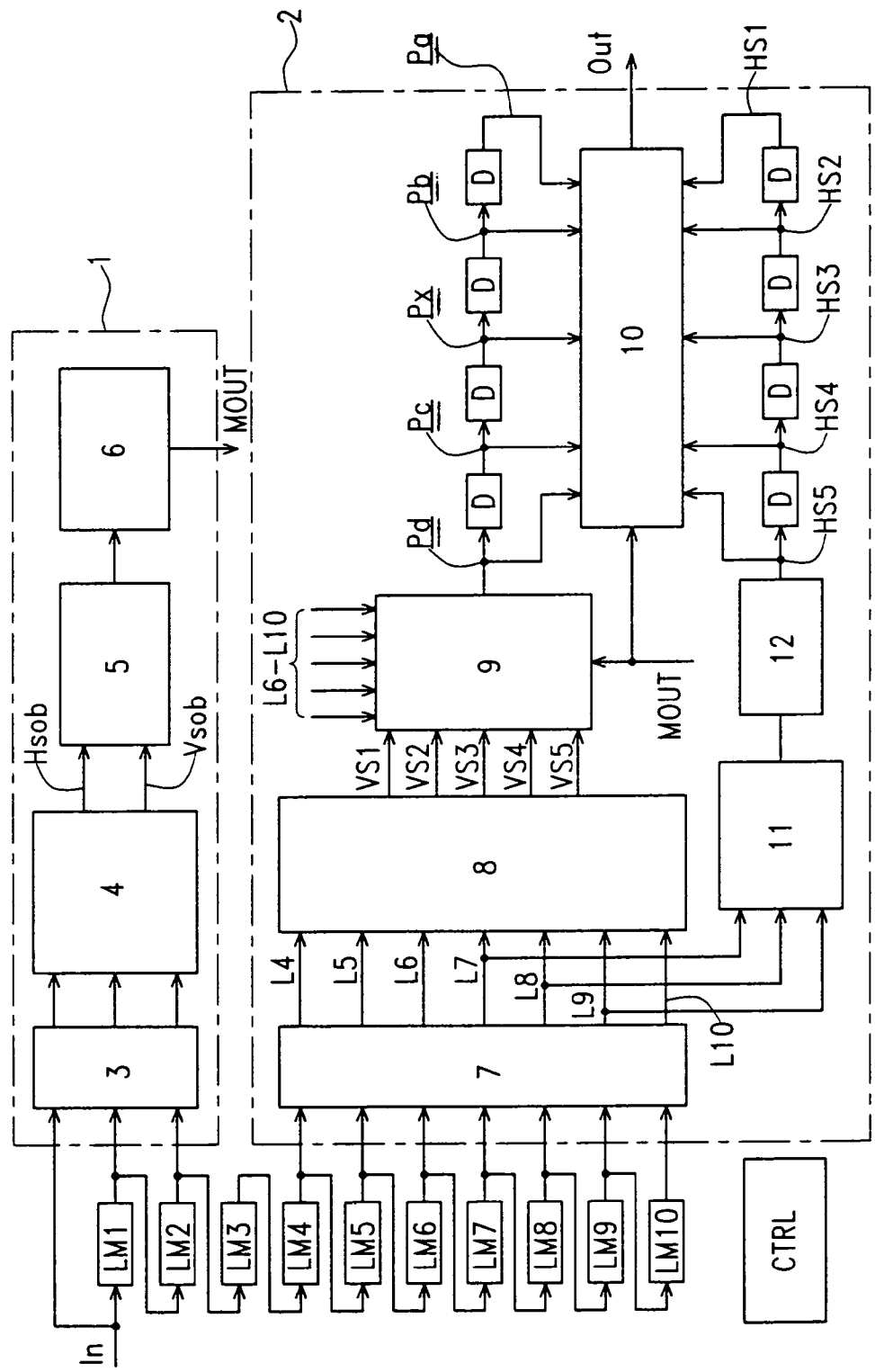
FIG. 10 is a block diagram of a device according to the present invention.

FIG. 10 is a block diagram of a device suitable for actuating the method previously described. The device comprises two main blocks: a global evaluator 1 evaluates the global features GF of the image blocks IB the image to be post-processed is divided in, and a local evaluator 2 evaluates the local features LF of the pixels of the image and performs the filtering according to both the global features and the local features.

It is assumed that the image to be post-processed is scanned line by line in a sequential order. Signal In is a stream of pixels of the input image scanned line by line. The global evaluator is supplied with signal In; signal In also supplies a cascade of two line memories LM1 and LM2 whose outputs supply the global evaluator 1.

Inside the global evaluator 1, signal In and the outputs of line memories LM1 and LM2 supply a first pixel delay module 3 of pixel delays suitable for implementing a 3*3 pixel window which is used to calculate horizontal and vertical Sobel operators for the pixels of the 6*6 image sub-block ISB inside each image block IB. The first pixel delay module 3 supplies a Sobel evaluator 4 which calculates the outputs Hsob and Vsob of the horizontal and vertical Sobel operators for those pixels of the current image line belonging to the 6*6 image sub-blocks ISB of each image block IB. The outputs Hsob and Vsob of the Sobel evaluator 4 are supplied to an accumulator 5 wherein they are accumulated. After eight image lines, i.e., a line of image blocks IB, have been scanned, the accumulated values Acc(Hsob), Acc(Vsob) (or alternatively the average thereof) for each image block IB are stored in a memory 6.

The output of line memory LM2 supplies a cascade of eight further line memories LM3-LM10. The local evaluator 2 is supplied in parallel with the outputs of line memories LM4-LM10. In this way, evaluation of the local features and calculation of the filter parameters starts after the global evaluator 1 has estimated the global features GF for a line of image blocks IB.

Inside the local evaluator 2, a second pixel delay module 7 of pixel delays is supplied with the outputs of line memories LM4-LM10; by means of the line memories LM4-LM10 and the second pixel delay module 7 it is possible to implement the 5*1 vertical processing window VPW. The outputs L4-L10 of the second pixel delay module 7 supply a vertical Sobel evaluator 8 which applies the vertical Sobel operator to each pixel inside the vertical processing window VPW. To avoid the use of further line memories, a parallel approach is preferred providing for calculating five vertical Sobel operators in parallel; the outputs of the five vertical Sobel operators VS1-VS5 are supplied to a vertical fuzzy filter 9, which is also supplied with the outputs L6-L10 of the second pixel delay module 7 and the output MOUT of the memory 6 of the global evaluator 1. MOUT supplies the global features GF of the image block IB currently processed by the local evaluator 2, i.e., the accumulated value Acc(Vsob) or, alternatively, the average of Acc(Vsob) and Acc(Hsob). The vertical fuzzy filter 9 evaluates the degree of membership of values VS1-VS5 to the fuzzy sets "Small" and "Big" taking into account the global features provided by MOUT, evaluates the activation levels of the nine fuzzy rules for the vertical direction, calculates the coefficients Vj (j=1 ... 5) of the vertical filter and applies the vertical filter coefficients Vj to the five pixels Pe, Pf, Px, Pg, Ph in the vertical processing window VPW, to calculate the vertically-filtered value P̱x of the pixel in the middle of the vertical processing window. The output of the vertical fuzzy filter 9 forms the vertically-filtered value P̱d of pixel Pd in the horizontal processing window HPW shown in FIG. 6 and supplies directly a horizontal fuzzy filter 10. The output P̱d of the vertical fuzzy filter 9 also supplies a cascade of four pixel delays D whose outputs respectively form the vertically-filtered values P̱c, P̱x, P̱b, P̱a of the pixels Pc, Px, Pb, Pa in the horizontal processing window HPW and supply the horizontal fuzzy filter 10.

In parallel to the operation of the vertical Sobel evaluator 8 and the vertical fuzzy filter 9, the outputs L7-L9 of the pixel delay module 7 supply a horizontal Sobel evaluator 11 which applies the horizontal Sobel operators to the pixels inside the horizontal processing window HPW. Differently from the vertical sobel operators, only one horizontal sobel operator is calculated at a time. A compensation delay module 12 introduces a delay for compensating the processing delay of the vertical fuzzy filter 9. The output of the compensation delay module 12, forming the output of the horizontal Sobel operator HS5 applied to pixel Pd of the horizontal processing window in FIG. 6, supplies the horizontal fuzzy filter 10 and a cascade of four pixel delays D, the outputs thereof forming the values HS4, HS3, HS2 and HS1 and supplying the horizontal fuzzy filter 10. The horizontal fuzzy filter 10, which is also supplied by the output MOUT of the memory 6 in the global evaluator 1 providing the value Acc(Hsob) (or alternatively the average of values Acc(Hsob) and Acc(Vsob)), evaluates the degree of membership of values HS1-HS5 to the fuzzy sets "Small" and "Big" according to the value of the global features GF provided by MOUT, evaluates the activation levels of the nine fuzzy rules described above for the filtering in the horizontal direction, calculates the coefficients Hj of the horizontal filter and applies the parameters Hj to the vertically-filtered values Pa, Pb, Px, Pc, Pd of the pixels Pa, Pb, Px, Pc, Pd in the horizontal processing window HPW to obtain the horizontally- and vertically-filtered value Out of the pixel Px under examination.

A control circuit CTRL controls the operation of blocks 1, 2 and the line memories LM1-LM10.

Figure 11:
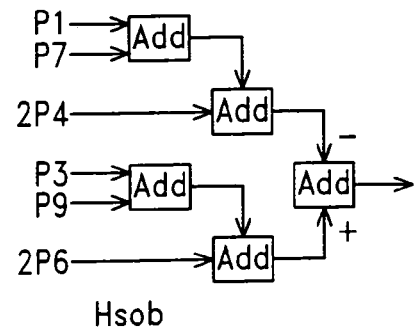
FIG. 11 shows the structure of two blocks of the device of FIG. 10.
Figure 11:
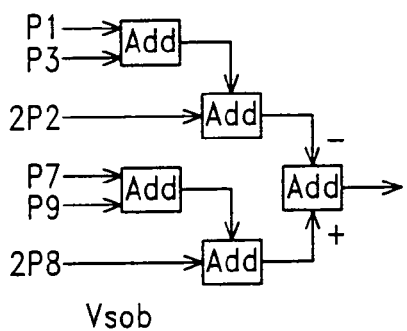

FIG. 11 shows the structure of the vertical and horizontal Sobel evaluators 8 and 11 of FIG. 10. They are composed in a straightforward way by adders as shown in FIG. 11.

Figure 12:
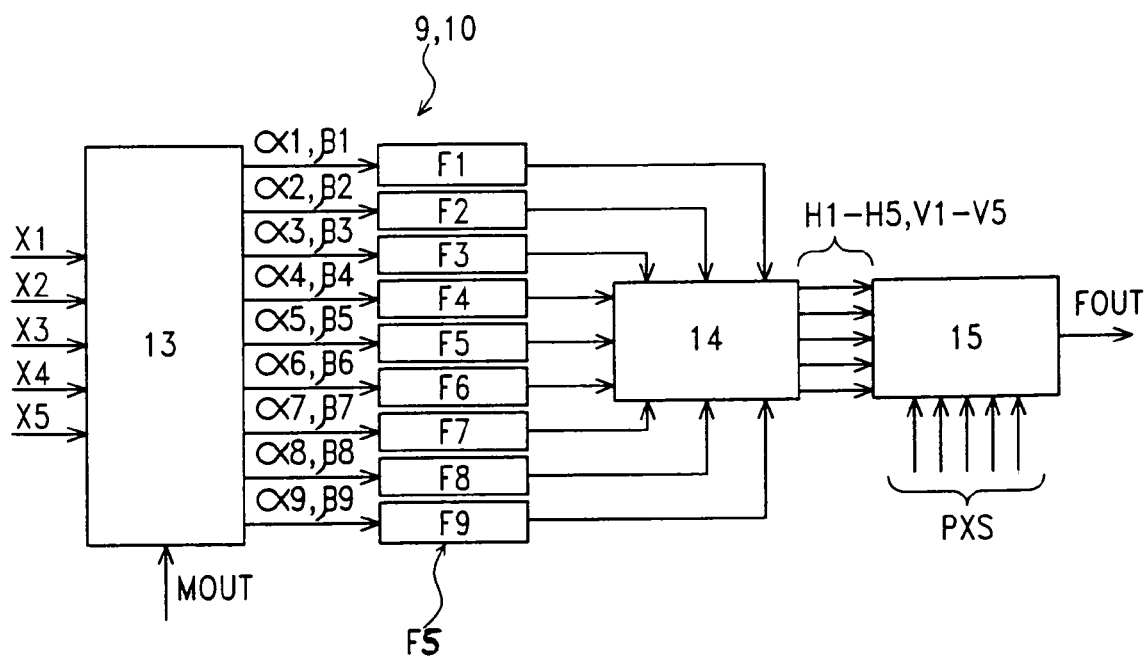
FIG. 12 is a block diagram of two other blocks of the device of FIG. 10.

FIG. 12 shows the structure of both the vertical fuzzy filter 9 and the horizontal fuzzy filter 10. X1-X5 are the vertical or, respectively, horizontal Sobel operator outputs VS1-VS5 and HS1-HS5. X1-X5 are supplied to a fuzzy rule evaluator 13 which evaluates the activation degrees $\beta1$-$\beta9$ of the nine fuzzy rules for the vertical direction or, respectively, the activation degrees $\alpha1$-$\alpha9$ of the nine fuzzy rules for the horizontal direction. The activation degrees evaluated by the fuzzy rule evaluator 13 are supplied to a look-up table of respective predefined filter parameters F1-F9 (forming block FS in FIG. 1), and the outputs of the look-up table, i.e., the predefined filter parameters cij multiplied by the activation degree of the respective fuzzy rule, are supplied to a filter composition module 14 which calculates the coefficients V1-V5 or, respectively, H1-H5, of the vertical or, respectively, horizontal filter. Said coefficients are then supplied to a processing module 15 which is also supplied with the pixel values PXS (L6-L10 or, respectively, Pa, Pb, Px, Pc, Pd in FIG. 10). The processing module 15 applies the filter coefficients to the pixel values to obtain the filtered value of the pixel under examination Px.

It will be appreciated that the structures shown in FIGS. 1 and 10-12 could be implemented in software on a typical general purpose computer or could be implemented using hardware elements specifically designed for the tasks discussed herein.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A post-processing method for reducing artifacts in block-coded digital images, the method comprising:
    a) dividing an input image into a plurality of image blocks;
    b) for each image block, estimating global features of said image block by providing information on an average content of image edges along horizontal and vertical directions of said image block;
    c) for each pixel of an image block under examination, estimating local features for said pixel by providing information on content of image edges along horizontal and vertical directions of an image area near said pixel; and
    d) modifying a value of said pixel according to both said global features of the image block to which said pixel belongs and said local features of the image area near said pixel.

2. The method according to claim 1 wherein the modifying step includes:
    d1) defining a set of predefined local features;
    d2) determining degrees of coincidence of said local features of the image area near said pixel with each of said predefined local features of said set, said degrees of coincidence depending on said global features of the image block to which said pixel belongs;
    d3) making the value of said pixel equal to a weighted average of the value of said pixel and of the values of neighboring pixels, with weight factors depending on said degrees of coincidence of said local features with each of said predefined local features.

3. The method according to claim 2, said step of determining the degrees of coincidence in step d2) includes performing a fuzzy calculation.

4. The method according to claim 3 wherein each of said predefined local features is associated with a respective group of predefined weight factors, and each of said weight factors is calculated as a weighted average of corresponding predefined weight factors of said groups with weight coefficients depending on said degrees of coincidence of said local features with each of said predefined local features.

5. The method according to claim 4 wherein said step of estimating global features of the image block under examination provides for applying horizontal and vertical Sobel operators to pixels belonging to an image sub-block internal to said image block under examination.

6. The method according to claim 5 wherein said step of estimating global features of the image block under examination provides for adding outputs of the horizontal Sobel operators applied to each pixel of said image sub-block to obtain an accumulated output of horizontal Sobel operators, and adding outputs of the vertical Sobel operators applied to each pixel of said image sub-block to obtain an accumulated output of vertical Sobel operators.

7. The method according to claim 6 wherein said global features of the image block under examination are formed by said accumulated outputs of the horizontal and vertical Sobel operators.

8. The method according to claim 6 wherein said global features of the image block under examination are formed by an average of said accumulated outputs of the horizontal and vertical Sobel operators.

9. The method according to claim 6 wherein said step of estimating local features for a pixel of the image block under examination includes:
    c1) considering a horizontal processing window containing the pixel under examination and neighboring pixels belonging to a same image line as the pixel and preceding and following the pixel;
    c2) applying said horizontal Sobel operator to each pixel of the horizontal processing window to obtain a horizontal pattern of horizontal Sobel operator outputs;
    c3) considering a vertical processing window containing the pixel under examination and neighboring pixels belonging to a same column of pixels as the pixel and preceding and following the pixel; and
    c4) applying said vertical Sobel operator to each pixel of the vertical processing window to obtain a vertical pattern of vertical Sobel operator outputs.

10. The method according to claim 9 wherein said horizontal and vertical processing windows each contains five pixels that are centered at said pixel under examination.

11. The method according to claim 10 wherein said step d2) provides for determining degrees of membership of each horizontal Sobel operator output of the horizontal pattern to a first fuzzy set "Small" and to a first fuzzy set "Big", evaluating activation degrees of a first set of fuzzy rules each associated with at least one predefined horizontal pattern of horizontal Sobel operator outputs, determining degrees of membership of each vertical Sobel operator output of the vertical pattern to a second fuzzy set "Small" and to a second fuzzy set "Big" and evaluating activation degrees of a second set of fuzzy rules each associated with at least one predefined vertical pattern of vertical Sobel operator outputs.

12. The method according to claim 11 wherein said step of determining degrees of membership of the horizontal Sobel operator outputs of the horizontal pattern to said first fuzzy sets "Small" and "Big" provides for determining a first and a second membership functions depending on said global features, and said determining degrees of membership of the vertical Sobel operator outputs of the vertical pattern to said second fuzzy sets "Small" and "Big" provides for determining a third and fourth membership functions depending on said global features.

13. The method according to claim 12 wherein said groups of predefined weight factors comprise groups of predefined horizontal weight factors and groups of predefined vertical weight factors, each fuzzy rule of said first set being associated with a respective one of said groups of predefined horizontal weight factors, and each fuzzy rule of said second set being associated with a respective one of said groups of predefined vertical weight factors.

14. The method according to claim 13 wherein said weight factors comprise horizontal weight factors and vertical weight factors, said horizontal weight factors being determined by making a weighted average of the predefined horizontal weight factors with weight coefficients being formed by the activation degrees of the fuzzy rules of the first set, and said vertical weight factors being determined by making a weighted average of the predefined vertical weight factors with weight coefficients formed by the activation degrees of the fuzzy rules of the second set.

15. The method according to claim 14 wherein the value of the pixel under examination is modified by applying the horizontal weight factors to the values of the pixels in the horizontal processing window and applying the vertical weight factors to the values of the pixels in the vertical processing window.

16. A post-processing device for reducing artifacts in block-coded digital images, characterized by comprising:
first means supplied with an input image for estimating global features of an image block under examination, said global features providing information on an average content of image edges along the horizontal and vertical directions of said image block;
second means supplied with said input image for estimating local features for each pixel of the image block under examination, said local features providing information on content of image edges along the horizontal and vertical directions of an image area around said pixel; and
third means supplied with said global features and said local features for modifying a value of said pixel according to both said global features and said local features.

17. The device according to claim 16 wherein said first means comprises means for evaluating horizontal and vertical Sobel operator outputs of horizontal and vertical Sobel operators applied to pixels of an image sub-block internal to said image block under examination, and accumulator means for accumulating the horizontal Sobel operator outputs and the vertical Sobel operator outputs for each pixel of the image sub-block.

18. The device according to claim 17 wherein said second means comprises fourth means for evaluating vertical Sobel operator outputs of vertical Sobel operators applied to said pixel and to vertically-neighboring pixels preceding and following the pixel in the vertical direction, and fifth means for evaluating horizontal Sobel operator outputs of horizontal Sobel operators applied to said pixel and to horizontally-neighboring pixels preceding and following the pixel in the horizontal direction.

19. The device according to claim 18 wherein said third means comprises vertical filter means supplied with said vertical Sobel operator outputs and said global features for calculating a vertically-filtered value of said pixel depending on said global features, said vertical Sobel operator outputs and the values of said vertically-neighboring pixels, and horizontal filter means supplied with said global features, said horizontal Sobel operator outputs and said vertically-filtered value of said pixel for calculating a horizontally-filtered value of said pixel depending on said global features, said horizontal Sobel operator outputs and the vertically-filtered values of said pixel and said horizontally-neighboring pixels.

20. The device according to claim 19 wherein said vertical filter means comprises first fuzzy computation means supplied with said vertical Sobel operator outputs and said global features for evaluating degrees of coincidence of the pattern of vertical Sobel operator outputs with a set of predefined patterns of vertical Sobel operator outputs, said degrees of coincidence depending on said global features, a look-up table of predefined vertical filter coefficients each one associated to at least one respective predefined pattern of vertical Sobel operator outputs, a vertical filter coefficients composition means supplied with said predefined vertical filter coefficients for generating a set of vertical filter coefficients which are a weighted average of the predefined vertical filter coefficients with weight coefficients formed by said degrees of coincidence, and a vertical filter supplied with said vertical filter coefficients and the values of the pixel and the vertically-neighboring pixels for providing at an output said vertically-filtered value of the pixel.

21. The device according to claim 20 wherein said horizontal filter means comprises second fuzzy computation means supplied with said horizontal Sobel operator outputs and said global features for evaluating degrees of coincidence of the pattern of horizontal Sobel operator outputs with a set of predefined patterns of horizontal Sobel operator outputs, said degrees of coincidence depending on said global features, a look-up table of predefined horizontal filter coefficients each one associated to at least one respective predefined pattern of horizontal Sobel operator outputs, a horizontal filter coefficients composition means supplied with said predefined horizontal filter coefficients for generating a set of horizontal filter coefficients which are a weighted average of the predefined horizontal filter coefficients with weight coefficients formed by said degrees of coincidence, and a horizontal filter supplied with said horizontal filter coefficients and the vertically-filtered values of the pixel and the horizontally-neighboring pixels for providing at an output said horizontally-filtered value of the pixel.

22. A post-processing method for reducing artifacts in a block-coded digital image, the method comprising:
dividing an input image into a plurality of image blocks;
for each image block, estimating global features of said image block by providing information on content of said image block along horizontal and vertical directions of said image block;

for each pixel of the image block under examination, estimating local features for said pixel by providing information on content of an image area that includes said pixel and adjacent pixels; and modifying the pixels of the image block under examination according to both said global features of the image block and said local features the pixels of the image block.

23. The method according to claim 22 wherein said step of estimating global features of the image block under examination includes:

applying horizontal and vertical Sobel operators to pixels belonging to an image sub-block of said image block under examination;

adding outputs of the horizontal Sobel operators applied to each pixel of said image sub-block to obtain an accumulated output of horizontal Sobel operators; and adding outputs of the vertical Sobel operators applied to each pixel of said image sub-block to obtain an accumulated output of vertical Sobel operators.

24. The method according to claim 22 wherein said step of estimating local features for each pixel of the image block under examination includes:

applying said horizontal Sobel operator to each pixel of a horizontal processing window to obtain a horizontal pattern of horizontal Sobel operator outputs, the horizontal processing window containing the pixel under examination and neighboring pixels belonging to a same image line as the pixel and preceding and following the pixel; and applying said vertical Sobel operator to each pixel of a vertical processing window to obtain a vertical pattern of vertical Sobel operator outputs, the vertical processing window containing the pixel under examination and neighboring pixels belonging to a same column of pixels as the pixel and preceding and following the pixel.

* * * * *